(12) United States Patent
Ohmae et al.

(10) Patent No.: US 6,188,787 B1
(45) Date of Patent: *Feb. 13, 2001

(54) IMAGE RECOGNITION METHOD AND DEVICE AND COPIER AND SCANNER EMPLOYING SAME

(75) Inventors: Kouichi Ohmae; Shinya Sonoda; Ikuo Kinoshita; Hitoshi Nakamura; Junji Hiraishi, all of Kyoto (JP)

(73) Assignee: Omron Corporation, Kyoto (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/826,701

(22) Filed: Apr. 7, 1997

(30) Foreign Application Priority Data

Apr. 5, 1996 (JP) ..................... 8-108637

(51) Int. Cl.[7] ..................... G06K 9/78
(52) U.S. Cl. ............ 382/165; 382/135; 382/317; 399/366
(58) Field of Search .................. 382/162, 165, 382/317, 135, 100; 380/5; 399/366; 283/72, 901

(56) References Cited

U.S. PATENT DOCUMENTS

| | | | |
|---|---|---|---|
| 5,216,724 | * 6/1993 | Suzuki et al. | 382/165 |
| 5,218,555 | * 6/1993 | Komai et al. | 382/165 |
| 5,363,454 | * 11/1994 | Udagawa et al. | 382/165 |
| 5,481,378 | * 1/1996 | Sugano et al. | 382/165 |
| 5,565,962 | * 10/1996 | Yoshimoto | 382/165 |
| 5,583,614 | * 12/1996 | Hasuo et al. | 382/165 |
| 5,828,777 | * 10/1998 | Suzuki | 382/135 |
| 5,917,619 | * 6/1999 | Yamagata et al. | 382/135 |
| 6,091,844 | * 7/2000 | Fujii et al. | 382/135 |

FOREIGN PATENT DOCUMENTS 2-210591   8/1990   (JP).

* cited by examiner

*Primary Examiner*—Jon Chang
(74) *Attorney, Agent, or Firm*—Dickstein Shapiro Morin & Oshinsky LLP

(57) ABSTRACT

An image recognition method and device detects an object mark reliably even when the mark is defaced with a different color. RGB signals are transmitted to color extraction unit. The color extraction unit has a characteristic color extraction block to extract the characteristic color of the object mark. A binary image is generated from the extracted pixels which are the color of the mark and stored in storage device. A mark detection unit detects the location of the mark in the stored image data and an image extraction unit extracts the region where the mark is located and obtains a feature count. A matching unit compares the feature count with a reference pattern and finds the goodness of fit. A control unit subjects the goodness of fit value to threshold value processing to determine whether this is a nonreproducible document. If the mark has been defaced with black ink, the pixels constituting the mark are extracted by a likely color extraction block. A binary image is generated and stored in storage device. Thus, the defaced mark can undergo the same recognition processing as the normal mark, and both can be recognized.

16 Claims, 17 Drawing Sheets

TEMPLATE

BINARY IMAGE DETECTED

IMAGE RECOGNITION METHOD AND DEVICE AND COPIER AND SCANNER EMPLOYING SAME

FIELD OF THE INVENTION

The invention is directed to an image recognition method and device that prevents the reading or printing of a document that should not be reproduced. Such a document could be a bank note, a stock certificate, or contain classified material. The invention is also directed to a copier or scanner in which this method and device are employed.

BACKGROUND OF THE INVENTION

With the development in recent years of such copying devices as full-color copiers, the quality of the reproduced image has reached the level at which the reproduction cannot be distinguished from the original image (i.e., the document) with the naked eye. This sort of faithful reproduction has become easy to obtain. The development of high-quality copiers has increased the risk that copiers will be used for an improper purpose. Documents which should not be reproduced, such as bank notes or stock certificates, might be copied. Classified documents might be copied and leaked. Various devices have been developed to address this risk.

One such device is the image processor described in the Japanese Patent Publication of Patent 2-210591. This processor works in the following way. The location of the characteristic portion of the bank note or other nonreproducible item (in the patent report, the red seal) is specified. The image data associated with the specified region are compared with previously recorded characteristics (i.e., with a reference pattern). From the goodness of fit of the two patterns (i.e., their degree of resemblance to each other) a determination is made as to whether the document being processed is one which may not be reproduced. If it is determined that this is a nonreproducible document, specified processing is executed to prevent it from being copied. This may be accomplished by interrupting the processing being executed by the copier, printing out a black screen, or printing out the original image with the word "copy" superimposed on it.

Existing image processors capable of detecting nonreproducible documents and preventing their reproduction often attempt to make their detection function fool proof in order to reliably prevent counterfeiting. To this end the threshold value used to make a determination is lowered to the point where some documents which should be reproduced are prohibited. When this happens, the essential function of the copier, which is to reproduce the document with precisely the same dimensions or at a specified magnification, will not be carried out. This has a deleterious impact on the ordinary, law-abiding user.

To prevent such situations from arising, the threshold value used to determine recognition can be set higher. In this case only items identical to the recorded characteristic (i.e., to the reference pattern) or very closely resembling it will be detected. A document that resembles the reference pattern (i.e., a document whose reproduction is not prohibited) will be permitted to be copied. However, if the reference mark is defaced, either on purpose or accidentally, so the degree of resemblance of the mark to the reference pattern is reduced, the mark will not be detected using the higher threshold, and copying will be permitted. For example, someone might cover the entire pattern on a document with black or some other color. If color is one of the criterion used for determination, the document, which now has a different color, will not be recognized as containing the item to be detected, and copying will be permitted.

This situation is not limited to copy machines, but also occurs with scanners and various other processing devices which read an image.

SUMMARY OF THE INVENTION

The object of the invention is to solve the problem outlined above and to provide an image recognition method and device which reliably detects all nonreproducible documents and whose detection capabilities are not compromised by tampering. In particular, tampering which changes the color of a part of, or all of, the document will not compromise detection. Another object is to provide a copy machine and a scanner in which such a method and device are employed.

In order to achieve the objects stated above, the image recognition method of this invention executes specified image processing with respect to image data obtained from the object under examination. The presence of a given mark, which is the target item to be detected among the image data, is recognized. When a mark is recognized which is a different color from that specified, but which still meets a certain criterion, the image data is recognized as containing the target item to be detected.

The method outlined above can be implemented by an image recognition device which executes specified image processing with respect to image data obtained from the object under examination and recognizes the presence of a given mark, which is the target item to be detected among the image data. This device is equipped with a mark detecting means to detect the specified mark and a different color detection means to detect, with reference to the specified mark, a mark of a different color which meets a certain criterion. The device, therefore, recognizes the image data having a different color mark as a target item.

Ideally, the aforesaid specified criterion should be that any one of the three color components, red (R), green (G) or blue (B), will vary or that any two of the components will vary. The different color could also be black.

Marks of a different color include marks whose color has been entirely changed and marks whose color has been partially changed. A variety of methods may be used to recognize the specified mark by the mark detection means. A reference pattern identical to the mark can be created and the image data may be matched against this reference pattern and the degree of resemblance (i.e., the goodness of fit) obtained. A graduated reference pattern can also be created from the specified pattern and the image data which are read can be averaged (processed to create gradation) and matched against the graduated reference pattern. In one embodiment, instead of the patterns themselves being compared, an appropriate feature count is extracted from the patterns and image recognition is based on this feature count.

The color of the differently colored mark is one likely to be used to deface the pattern. That is to say, the "differently colored mark" referred to in this invention is a mark comprising either partially or entirely of a color likely to be used to deface the pattern.

The mark detection means to detect an undefaced mark and the different color detection means to detect a differently colored mark may be independent of each other, but they may share a common unit to execute the actual recognition processing.

The mark detection means to detect an object mark has a characteristic color extraction block 17, a component within color extraction unit 10, which extracts the characteristic color of the mark; memory device 11; mark detection unit 12; image extraction unit 13; matching unit 14; dictionaries 15 and control unit 16. The different color detection means to detect a differently colored mark has likely color extraction block 18, a component within color extraction unit 10, which extracts a color with which the aforesaid characteristic color is likely to be defaced; memory device 11; mark detection unit 12; image excision unit 13; matching unit 14; dictionaries 15 and control unit 16. All components beyond memory device 11, then, are shared.

The function of recognizing the presence of a specified mark detected by either of the detection devices rests with the OR element 19 in color extraction unit 10.

The copy machine or scanner of this invention is equipped with one of the image recognition devices described above. With a copy machine, the image data output by the copy machine's image reading device are input in parallel to both the means to convert the image to signals and to the aforesaid image recognition device. With a scanner or printer, the input and output signals to the control unit of the scanner or printer are input in parallel to the image recognition device.

Based on the scanned image data, a determination is made as to whether the image data contain the item to be detected, which indicates a nonreproducible document. If it is determined that the document contains the item to be detected, a control signal is transmitted to the aforesaid processing unit to control specified processing required to copy, read, or output (i.e., print out) the image.

When a copier using this invention attempts to copy a bank note, or other nonreproducible document, or when a scanner using this invention attempts to read an original document, the characteristic mark on the document will be detected. A command will be issued to halt the copying operation, making it impossible to copy, read or print the document in question.

DETAILED DESCRIPTION OF THE INVENTION

Figure 1:
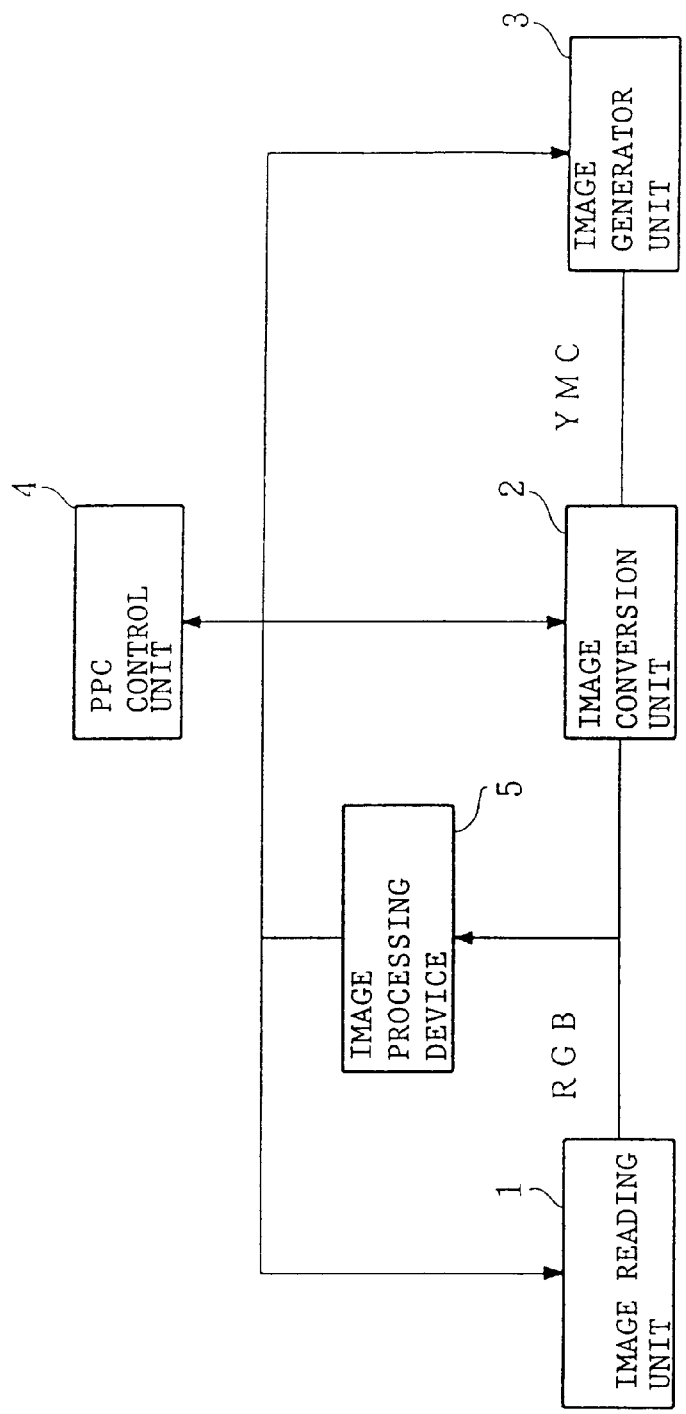
FIG. 1 is a block diagram of the overall configuration of a copy machine which is a preferred embodiment of the invention.

FIG. 1 shows an example of a color copy machine in which the image recognition device of this invention is installed. As shown in the drawing, the color copy machine has a image reading unit 1, which has an imaging device, such as a CCD, an amplifier for the output of this CCD and an A/D converter to convert to digital RGB signals image data comprising of electrical signals which have been detected. The RGB signals generated by image reading unit 1 are transmitted to the next stage, image conversion unit 2.

In image conversion unit 2, the RGB signals which are received are analyzed into separate components which are the colors of the ink: magenta (M), cyan (C), yellow (Y) and black (Bk). The resulting YMC signals are output to image generator unit 3. In response to the YMC signals it receives, image generator unit 3 projects a laser beam onto specified locations on a light-sensitive drum, executes the processing necessary to reproduce the image on the copy paper and prints out the image. This processing sequence (or more properly, the flow of signals) is controlled by PPC control unit 4. Since the configuration used to perform the actual processing involved in the color reproduction process is identical to that used in the prior art, we shall omit further explanation.

The output signals (RGB) from the aforesaid image reading unit 1 are transmitted in parallel to both the image conversion unit 2 in the copy machine proper and the image processing device 5 of this invention. The device obtains the goodness of fit (the degree of resemblance of the image data to the mark used to determine whether this is a nonreproducible item), which is used as the criterion for determining whether a mark indicating that this is a nonreproducible document has been found in the received image data. It outputs this goodness of fit to PPC control unit 4 in the copy machine. Based on the goodness of fit which is obtained, the device determines whether the image being processed is the item to be detected, namely, a nonreproducible document. The result of this determination is sent to the PPC control unit 4. If the image data are found to contain a nonreproducible document, the PPC control unit 4 transmits a "prohibit copying" command to either the image conversion unit 2 or the image generation unit 3. Specified processing is executed to interrupt the printing of the image data.

In other words, when the image processing device 5 outputs the goodness of fit and the PPC control unit 4 determines whether this is a nonreproducible item, the image processing device 5 and the control unit 4 constitute the image recognition device of this invention. When the image processing device 5 makes the final determination as to whether this is a nonreproducible item, only the device 5 constitutes the image recognition device.

Figure 2:
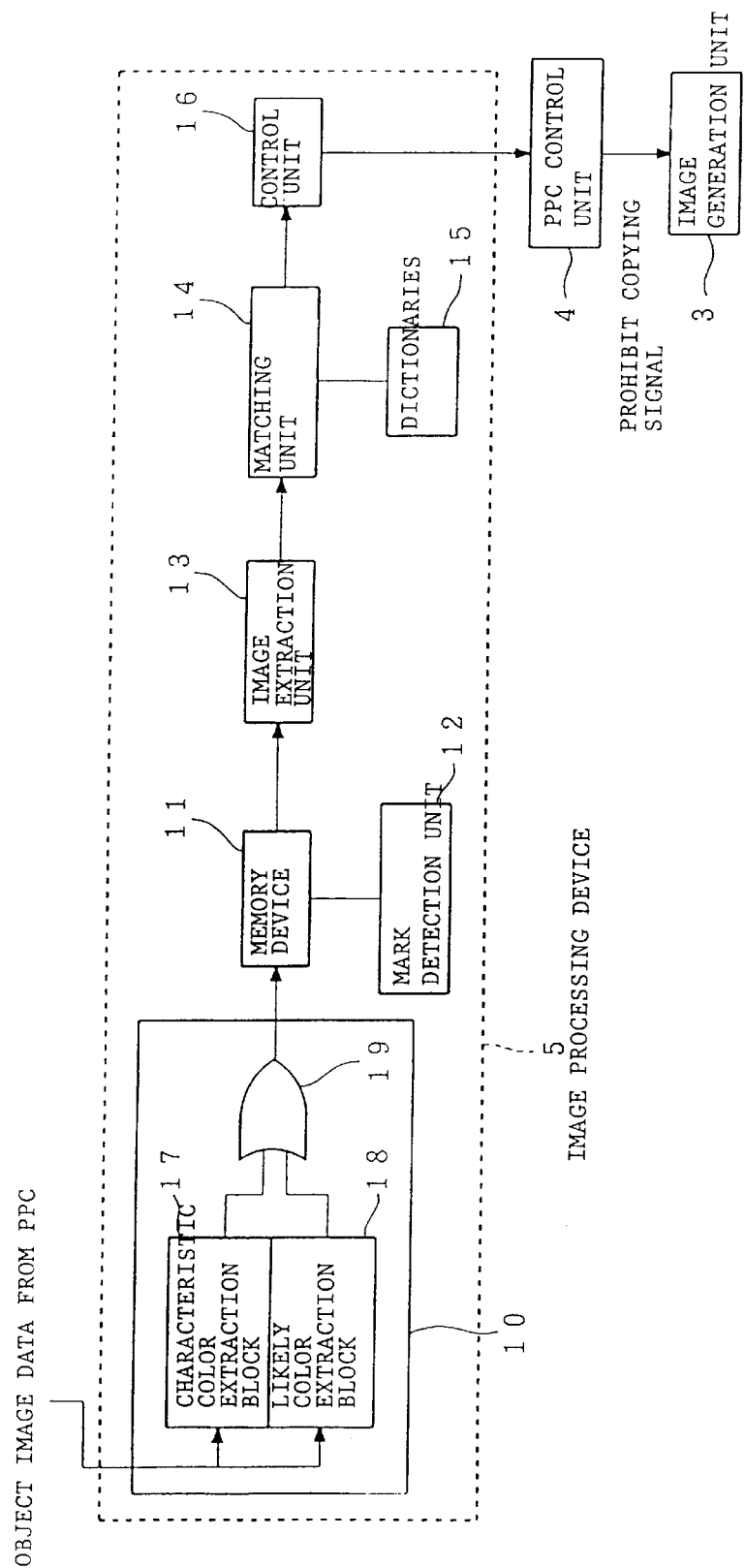
FIG. 2 is a block diagram of the internal configuration of the image processing device used in this copy machine.

An example of the image processing device 5 is shown in FIG. 2. As can be seen in the drawing, the device 5 contains a color extraction unit 10, which extracts the pixels of a given color from the image data (RGB) received from the copy machine (specifically, from the image reading unit 1). It also contains a memory device 11, which stores the (binary) image pixels extracted by the color extraction unit 10 and the mark detection unit 12, which reads out the binary image stored in the memory device 11 and detects the location of a given mark in that image. The image extraction unit 13 is the means to extract a feature count. Based on the location of the mark detected by the mark detection unit 12, the image extraction unit 13 excises a specified region of the binary image stored in memory device 11 and transmits it to the matching unit 14. The matching unit 14 uses knowledge stored in dictionaries 15 to execute specified recognition processing (i.e., matching processing) on the image data it receives from the extraction unit 13. The control unit 16 executes specified processing based on the result of the processing done by the matching unit 14 (i.e., on the feature count which is extracted).

We shall now give a detailed explanation of each component. The color extraction unit 10 has two components, one to extract the color of the ordinary reference mark, the target item to be detected (the characteristic color of the mark), and the other to extract the color with which the mark is likely to be defaced.

In concrete terms, the color extraction unit has two blocks, a characteristic color extraction block 17 and a likely color extraction block 18, connected in parallel. The block 17 extracts the characteristic color of which the reference mark is constituted. The block 18 extracts a color with which the aforesaid characteristic color is likely to be defaced (the "likely color"). The RGB data are sent to both blocks 17, 18. Thus, the extraction unit comprises the two color extraction blocks 17, 18 arranged in parallel, and the OR element 19, which takes the logical sum of the output of blocks 17, 18.

Figure 3:
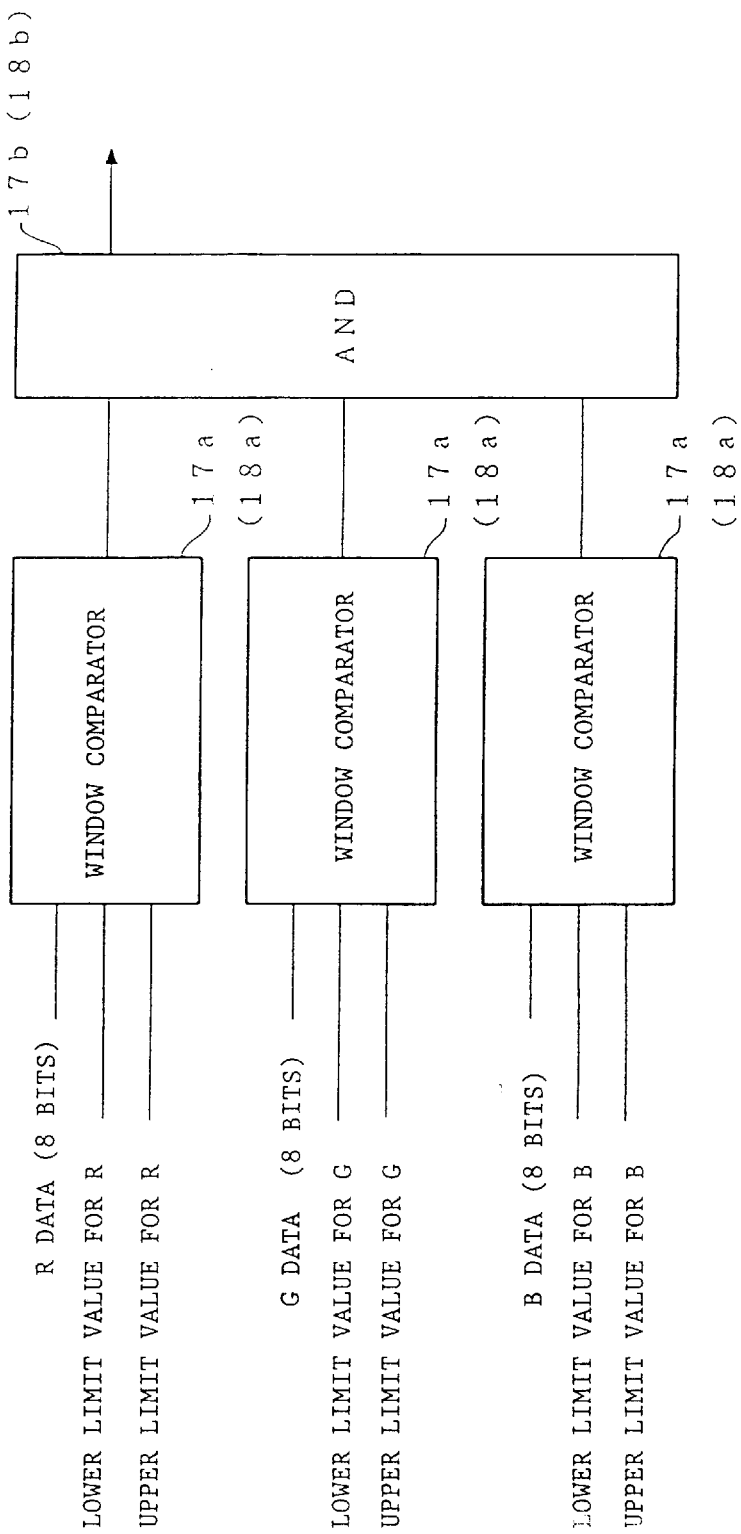
FIG. 3 is a block diagram showing an example of a configuration for the color extraction unit.

The internal configuration of the characteristic color extraction block 17 to extract the characteristic color of the mark and the likely color extraction block 18 to extract the color likely to deface the mark can be largely shared. Specifically, as can be seen in FIG. 3, the extraction blocks 17, 18 have three window comparators 17a (18a) for R, G and B and element 17b (18b), which receives the output of each of window comparators 17a (18a). The density value (8 bits) of each R, G or B signal is sent to each of window comparators 17a (18a).

In each window comparator 17a (18a), upper and lower limit values are established, with a given margin above and below, for the density of each of the R, G, and B signals of the color detected. In this way, all pixels can be extracted whose R, G, and B signals have densities within a fixed range (from the upper limit value to the lower limit, or threshold, value). When a pixel is found whose density is within a given range, the outputs of all three window comparators 17a (18a) go to "1", so the output of AND element 17b also goes to "1", and the pixel is extracted as a candidate for a constituent of the mark.

In this example, the reference mark is blue, so block 17, which extracts the characteristic color of the mark, will extract all pixels for which the received pixel color data (256-step RGB) have densities which indicate "blue". The color likely to deface the mark in this example is black. Block 18, which extracts the color likely to be used to deface the mark, will extract all pixels for which the received pixel color data (256-step RGB) have densities which indicate "black".

Figure 4A:
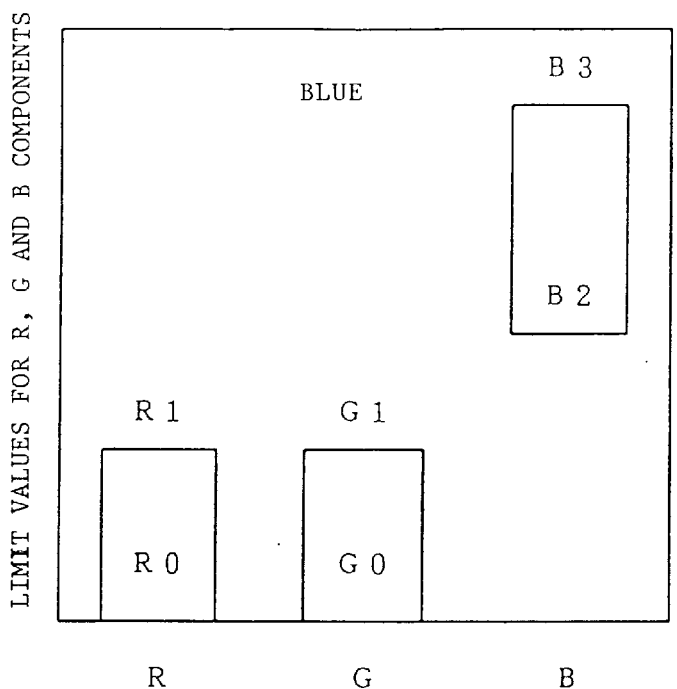
FIGS. 4(A) and 4(B) show an example of the distribution of R, G and B in the characteristic color of the mark and a color likely to be used to deface it.
Figure 4B:
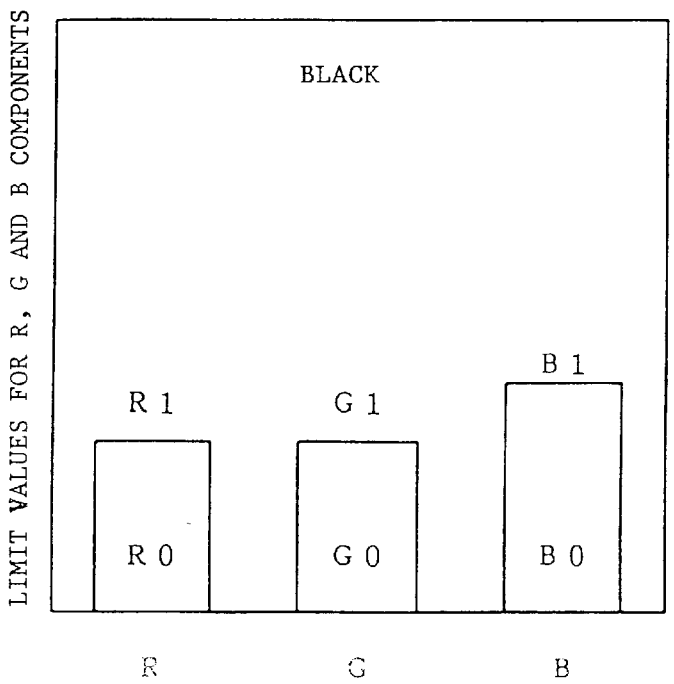

Let us assume that the relationships between the R, G and B components for blue and black are those shown in FIGS. 4(A) and (B). The limit values established in the three window comparators 17a in extraction block 17 will be as follows.

Lower limit value for R: R0

Upper limit value for R: R1

Lower limit value for G: G0

Upper limit value for G: G1

Lower limit value for B: B2

Upper limit value for B: B3

Similarly, the limit values established in the three window comparators 18a in extraction block 18 will be as follows.

Lower limit value for R: R0

Upper limit value for R: R1

Lower limit value for G: G0

Upper limit value for G: G1

Lower limit value for B: B0

Upper limit value for B: B1

Block 17, then, which extracts the characteristic color of the mark, will output a binary image such that all pixels which meet the conditions $$R0 \leq R \leq R1$$

$$G0 \leq G \leq G1$$

$$B2 \leq B \leq B3$$

will go to "1" and all pixels outside that range will go to "0".

Block 18, which extracts the color likely to be used to deface the mark, will output a binary image such that all pixels which meet the conditions $$R0 \leq R \leq R1$$

$$G0 \leq G \leq G1$$

$$B0 \leq B \leq B1$$

will go to "1" and all pixels outside that range will go to "0".

Thus, when the data for a nonreproducible image which has not been defaced are sent to color extraction unit 10, extraction block 17 will extract the pixels which form the blue portion that constitutes the reference mark, and these pixels will go to "1". Extraction unit 10 will output a binary image in which at least the portions constituting the mark will be "1". Naturally, if there are other pixels in the image which have the same RGB data as the specified color, blue in this case, those portions also will be output as "1".

If the portion of the document containing the mark has been defaced with black, that portion will be extracted by block 18, the block to extract the color with which the mark is likely to be defaced. Either way, a binary image will be output in which the portion with the reference mark will be "1".

Figure 5:
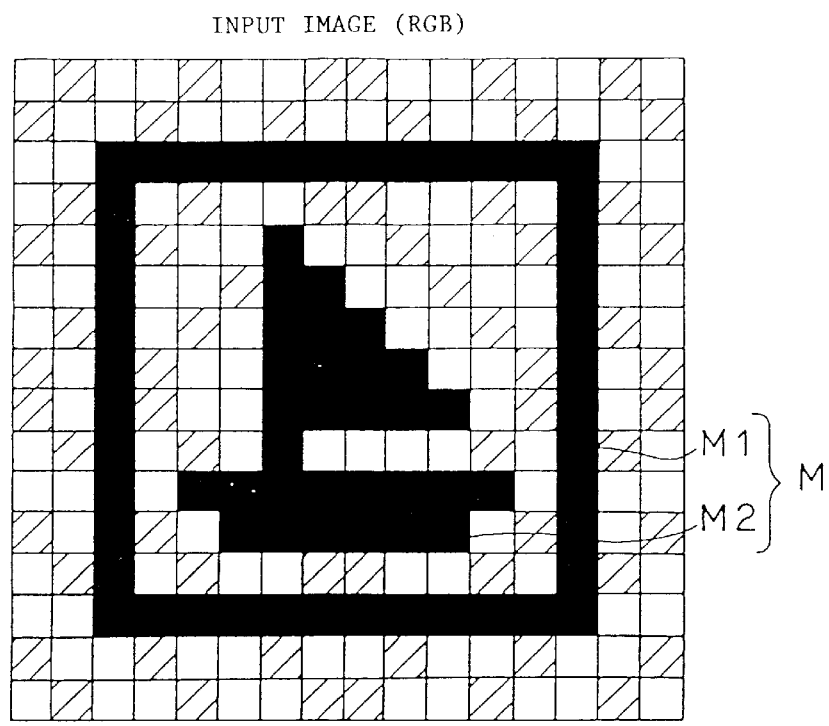
FIG. 5 shows an example of an image input into the color extraction unit.

As an example, let us assume that the mark M to be detected, which is to be used to detect nonreproducible documents, is shaped like the black areas in FIG. 5. This mark comprises square frame M1 and mark element M2, a formalized version of a sailboat inside the frame. Frame M1 and mark element M2 are both blue. The contiguous pixels inside and outside frame M1 are a different color (preferably one with low density).

In this case, the colored image (RGB) shown in FIG. 5 is input. Black portions represent blue, white and hatched portions represent colors other than blue or black. Blue portions which have not been defaced (in the drawing, black portions) will be detected by extraction block 17 and output as "1". The other colors (white and hatched portions) will not be extracted by either block 17 or block 18 and will be output as "0".

Figure 6:
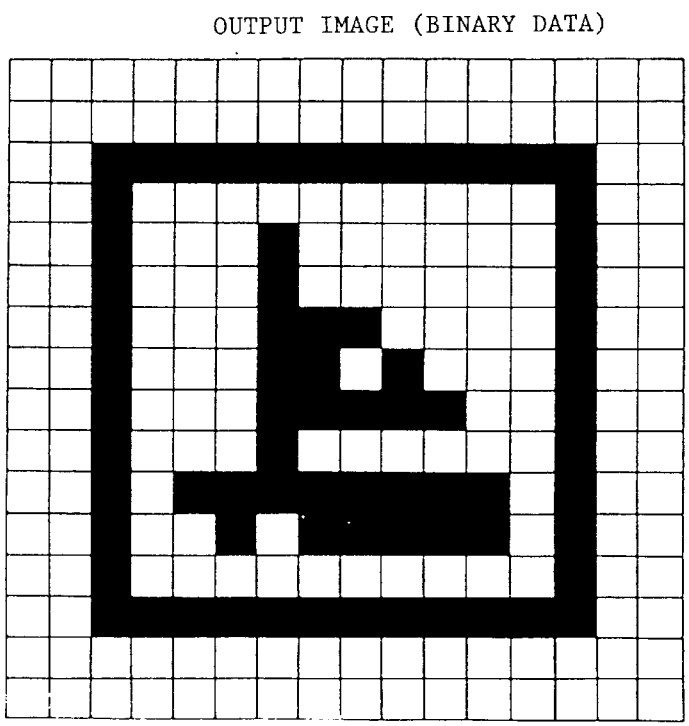
FIG. 6 shows the image output by the color extraction unit when the image data shown in FIG. 5 have been input.

The result, shown in FIG. 6, is that a binary image is output. This image is stored in memory device 11. In the example shown in FIG. 6, the result has two errors. Three pixels which should be "1" have been detected as "0", and one pixel which should be "0" has been detected as "1". This sort of mistake can result from a printing or detecting error.

Let us assume that frame M1 and/or element M2 has been completely or partially defaced and obscured with black. When the document is read, all black pixels, which have been detected by extraction block 18, will be output as "1". Even if the reference mark is defaced by being drawn over with black, the binary image output by the color extraction unit 10 will be identical to the original mark, as shown in FIG. 6.

The memory device 11 comprises a given number of line buffers. The mark detection unit 12 detects the mark using the aforesaid binary image. The image extraction unit 13 can excise the appropriate portion of the image and extract a feature count, so there is no need to save the entire image data from the document. The memory device can have several tens of lines needed for the final stage of processing.

Figure 7:
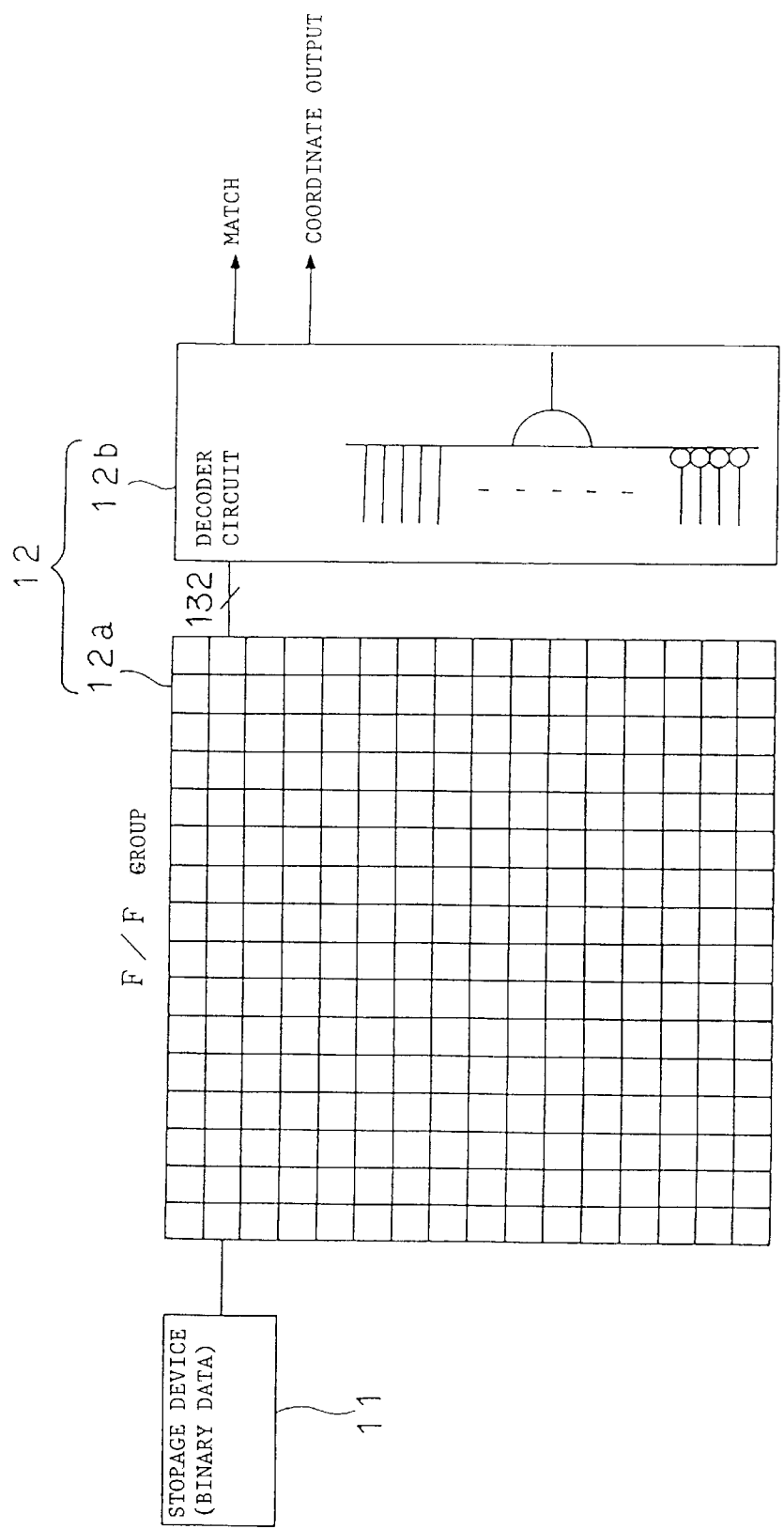
FIG. 7 shows an example of how the mark detection unit can be configured.

The mark detection unit 12 detects the location of the mark. As shown in FIG. 7, it comprises flip-flop group 12a, which contains 16×16 flip-flops, and decoder circuit 12b, which receives the output from certain of the flip-flops constituting group 12a and determines whether this output is identical to the expected data (1/0).

The binary image data (1/0) stored in each line of the line buffers of the memory device 11 is input to the corresponding row of flip-flops starting with the first pixel, which is input to the head flip-flop in the row. At the same time, each flip-flop receives a clock signal. The data are transmitted synchronously to the next-stage flip-flop. Thus each time a clock signal is input, it is as though a single pixel is scanned in the main scanning direction. When all the pixel data (1/0) for a given line have been input, we move one line down and begin entering pixel data from the next head flip-flop. This has the same effect as moving down one pixel in the direction of feed. When 16 pixels of data have been input starting from the head flip-flop, the data are stored in all the flip-flops. The output of flip-flop group 12a at this point will be equivalent to the binary image data stored in memory device 11.

Figure 8:
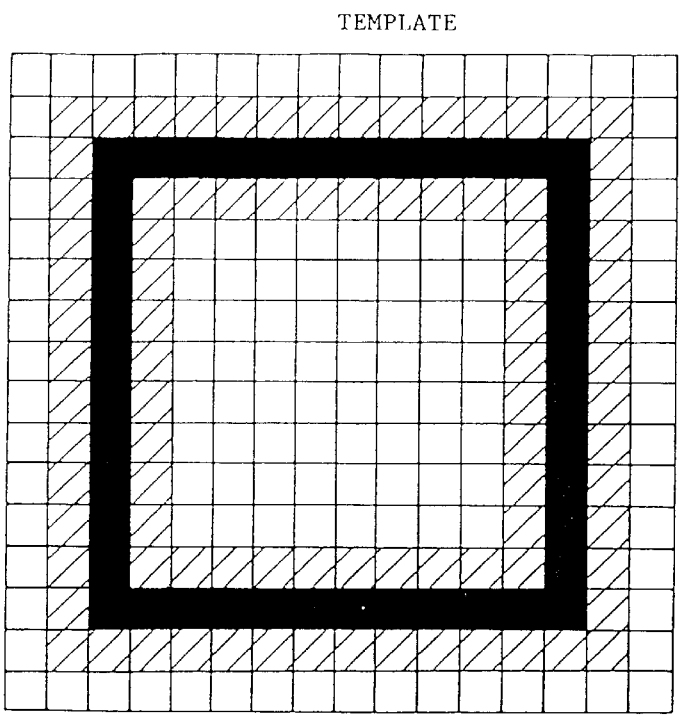
FIG. 8(A) shows the template used by the mark detection unit.
FIG. 8(B) shows an example of image data input into the mark detection unit.

Decoder circuit 12b detects the presence in the image data of the frame M1 in mark M. It matches the input image against the template shown in FIG. 8(A). If the images coincide, it outputs a signal indicating detection. The template used here comprises a square frame (or boundary) three pixels in width, with black pixels in the portion which corresponds to frame M1 and white pixels in the region one pixel inside and outside the frame (shown by hatching in the drawing). Pixels in other locations are ignored.

Decoder circuit 12b comprises AND elements which receive the output of the 132 flip-flops corresponding to the aforesaid three-pixel-wide template. The input terminals which receive the output of the flip-flops for the region which should have white pixels (the hatched portion in FIG. 8(A)) have inverted input. If the black pixels represented by "1" match the template, the inputs of all the AND elements in decoder circuit 12b go to "1", and the output of the decoder circuit 12b goes to "1". If even one pixel value is different, the input to the AND elements will include a "0", and the output of the decoder circuit 12b will go to "0".

Figure 8B:
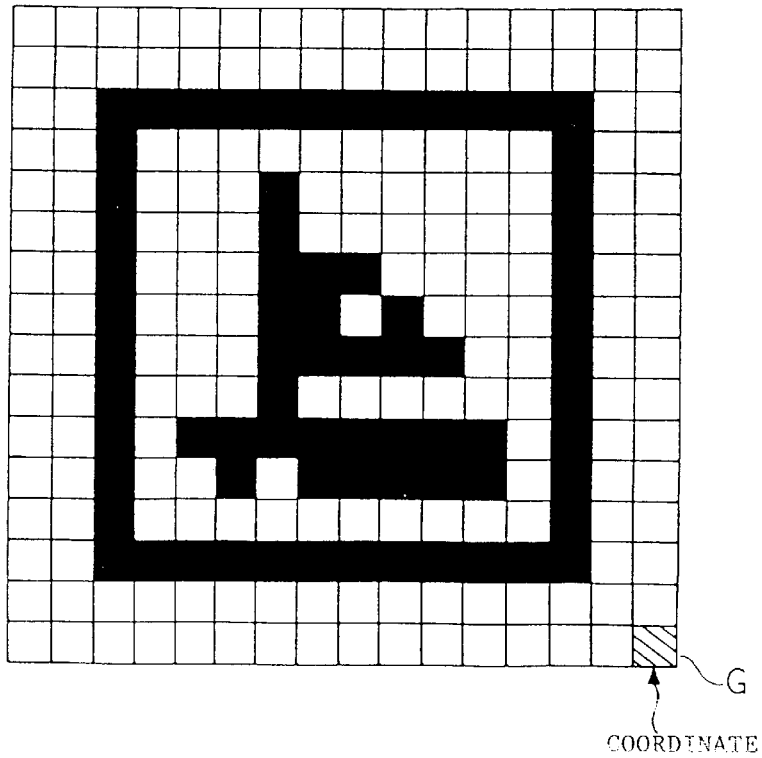

Let us assume that at a given point in time, the binary image stored in flip-flop group 12a is that shown in FIG. 8(B). When this image is matched with the template, it will be found to coincide, and a signal indicating detection (a match signal) will be output. At this time, the coordinates (address) of pixel G in the lower right-hand corner of FIG. 8(B) which are stored in the memory device 11 will also be output.

Figure 9:
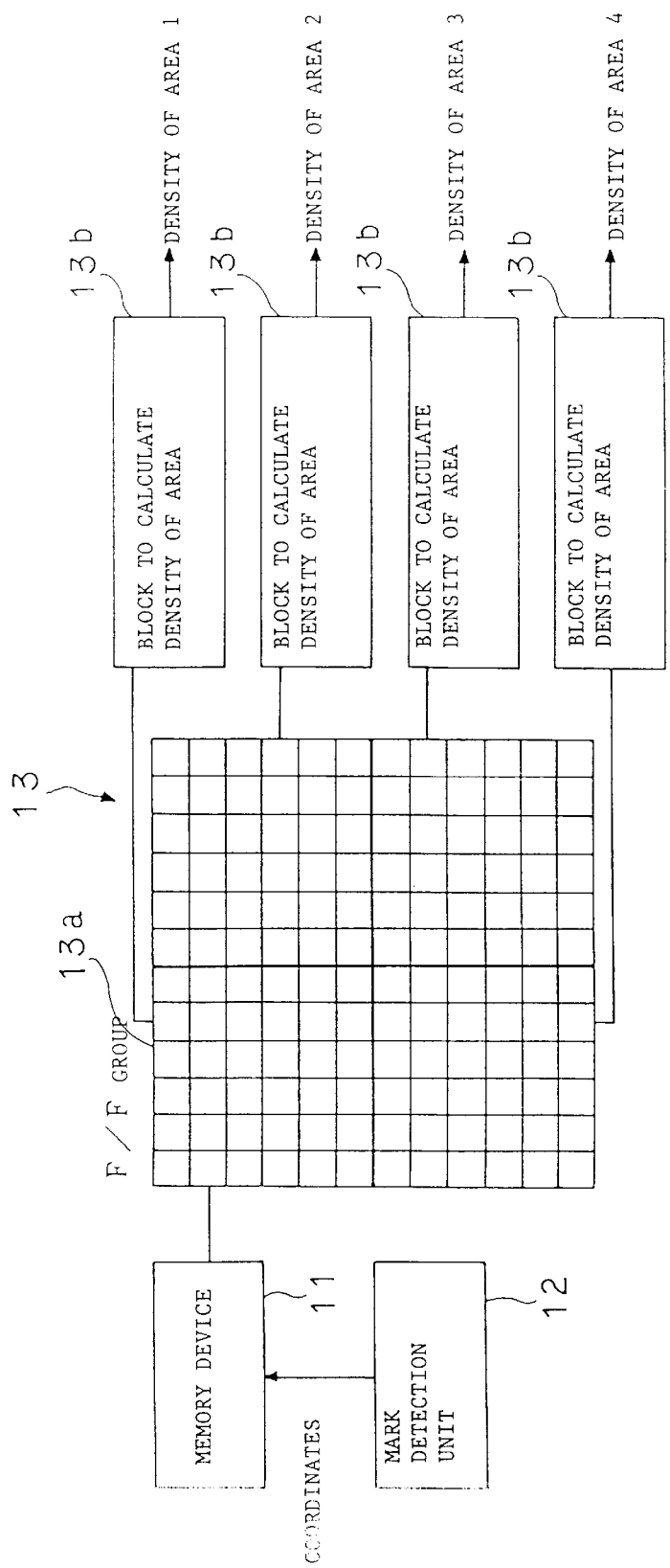
FIG. 9 shows an example of how the image extraction unit can be configured.

The image extraction unit 13 comprises the 12×12 flip-flop group 13a shown in FIG. 9 and block 13b, which extracts the density of an area. When mark detection unit 12 detects square frame M1, the extraction block excises all the image data which form a part of the frame and all the data inside it. It divides these data into a number of areas (here, four) of 6×6 pixels, extracts a feature count for each area, and outputs the result.

In this example, the feature count is extracted by calculating the number of black pixels (i.e., the density) in each area. Using the coordinate data output by the mark detection unit 12, the appropriate pixel data stored in the memory device 11 are transmitted to 12×12 flip-flop group 13a, which corresponds in size to the region of pixels (also 12×12) constituting mark M.

Figure 10:
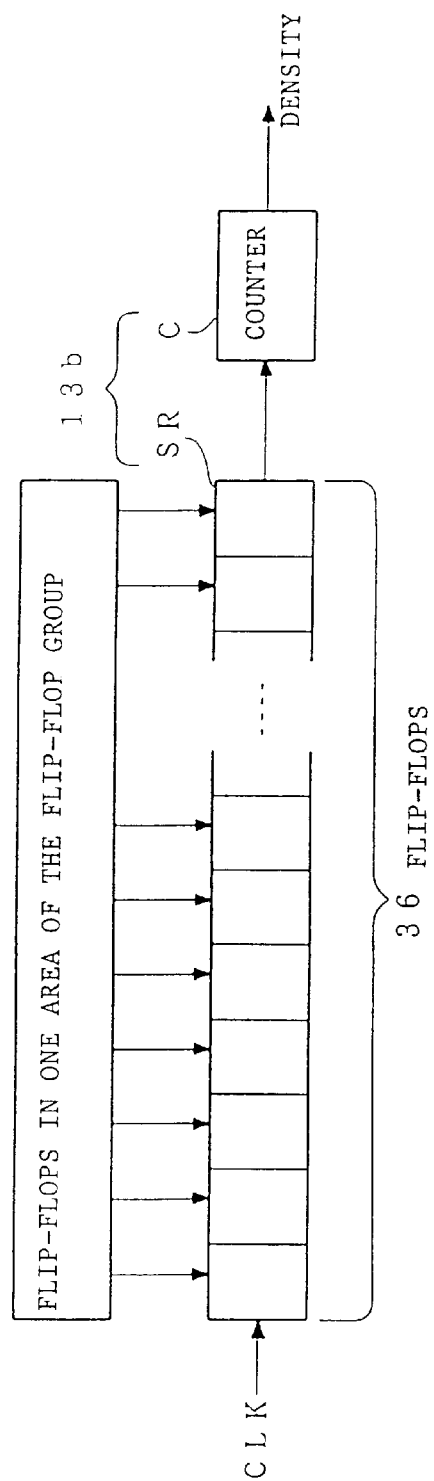
FIG. 10 shows an example of the internal configuration of the block to extract the density of an area.

To execute this processing, the output of the flip-flops for each of the 6×6 pixel areas in 12×12 flip-flop group 13a is transmitted to the corresponding unit 13b to calculate the density of that area. Calculation units 13b calculate the number of flip-flops in each area whose output is "1". As is shown in FIG. 10, each unit may comprise a 36-stage (equal to the number of flip-flops in the area) shift register SR with parallel input and serial output and a counter C which receives the output of the shift register SR and counts up when it is "1". The count value of the counter C is reset after each measurement.

In this way, the binary image data stored in the flip-flop group 13a can be latched into the shift register SR at specific times. The output (1/0) of shift register SR is input into counter C along with a clock signal CLK. After 36 clock signals CLK have been input, the count value of counter C will be the number of flip-flops in that area whose output is "1".

Figure 11:
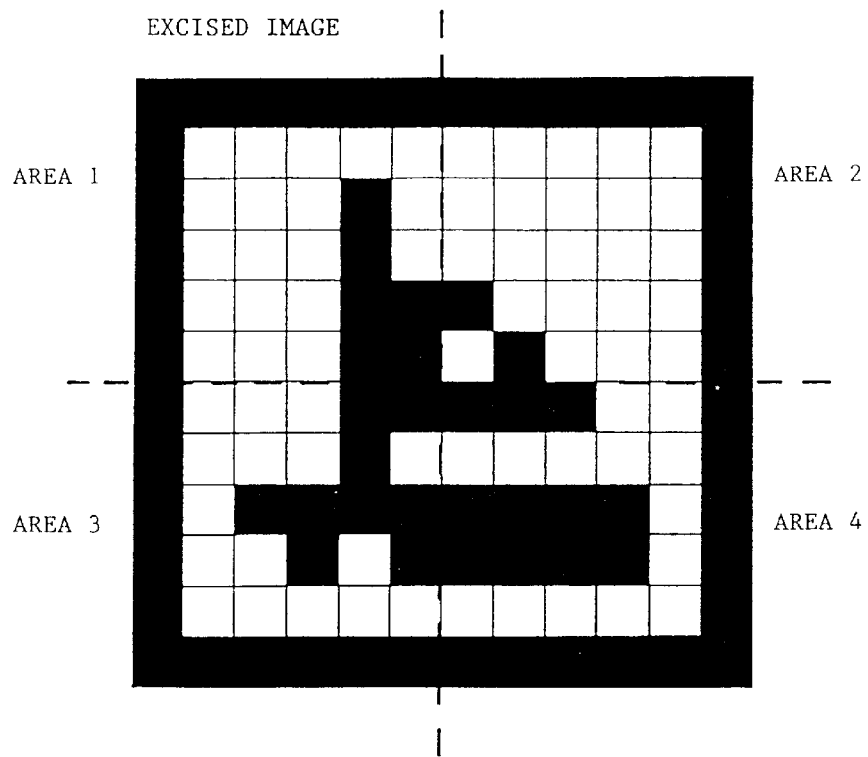
FIG. 11 illustrates the operation of the image extraction unit.
Figure 12:
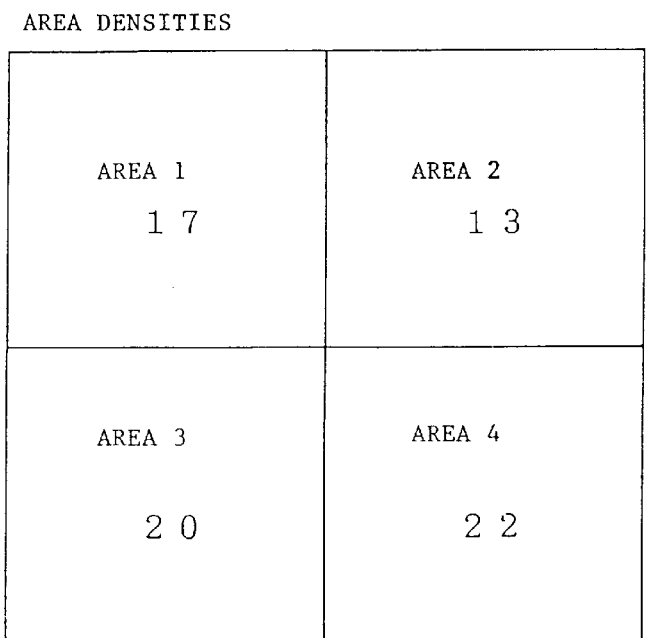
FIG. 12 illustrates the operation of the image extraction unit.

Let us assume that the image detected by mark detection unit 12 and excised using coordinate value G is that shown in FIG. 11. Counter C calculates the number of black pixels in each of four 6×6 pixel areas created by dividing the 12×12 pixel region along the broken lines. As is shown in FIG. 12, the density, which is equivalent to the feature count for each area is 17 for Area 1, 13 for Area 2, 20 for Area 3 and 22 for Area 4. These feature counts (or densities) are transmitted to the matching unit 14.

Matching unit 14 takes the extracted densities of Areas 1 through 4 and compares them with reference values. The previously recorded density for each area of the mark used for comparison (i.e., the reference pattern) is stored in one of four dictionaries 15 in the form of a membership function. Based on the knowledge stored in dictionaries 15, the goodness of fit is obtained for each area. The average of these values is obtained and output as the final goodness of fit.

Figure 13:
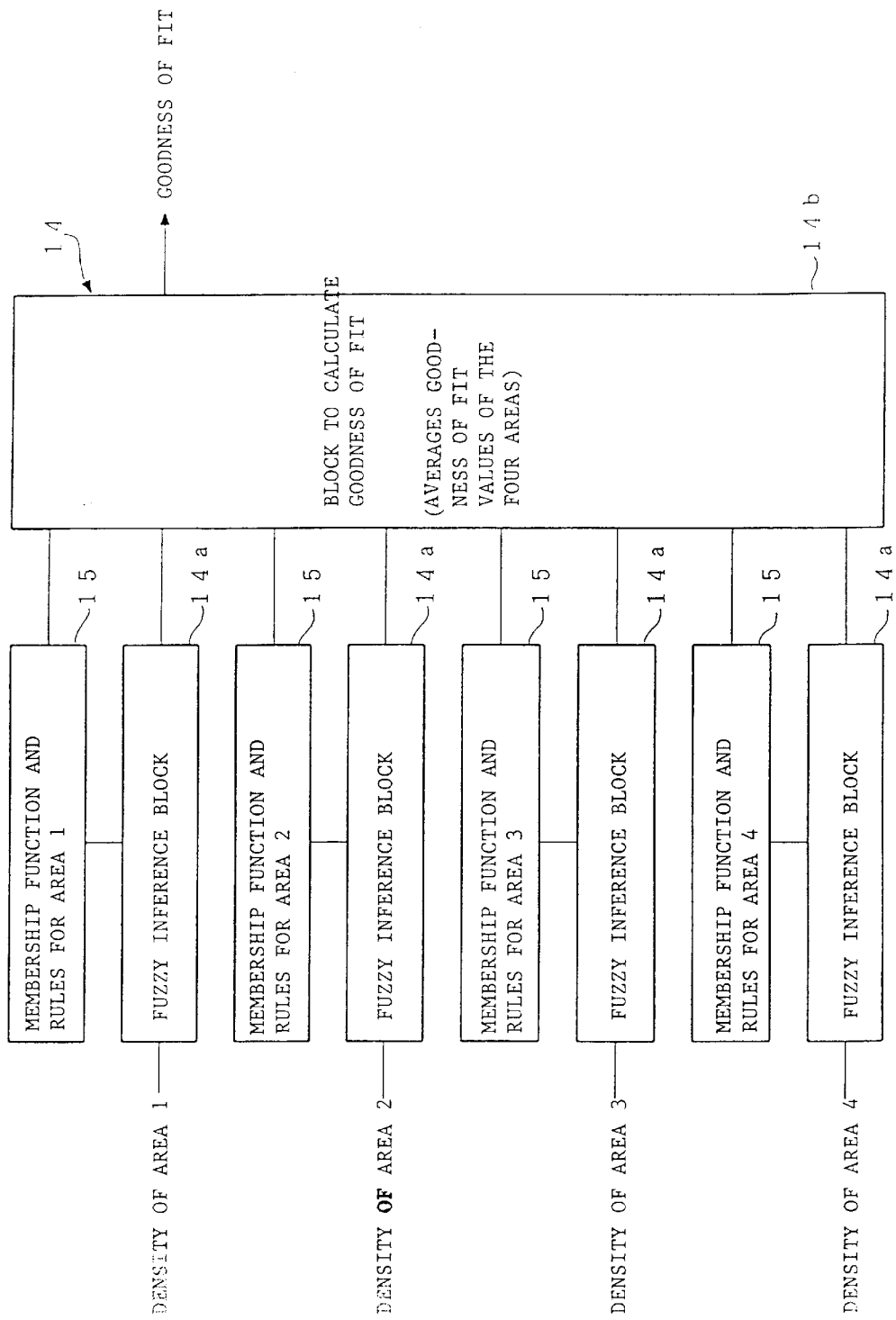
FIG. 13 shows an example of the internal configuration of the matching unit.
Figure 14:
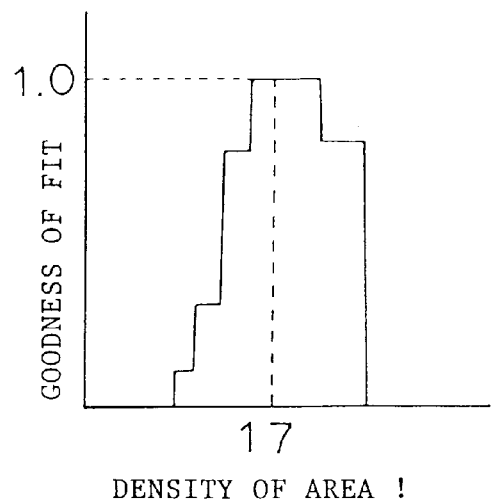
FIGS. 14(A)–14(D) give examples of membership functions used by the matching unit.
Figure 14:
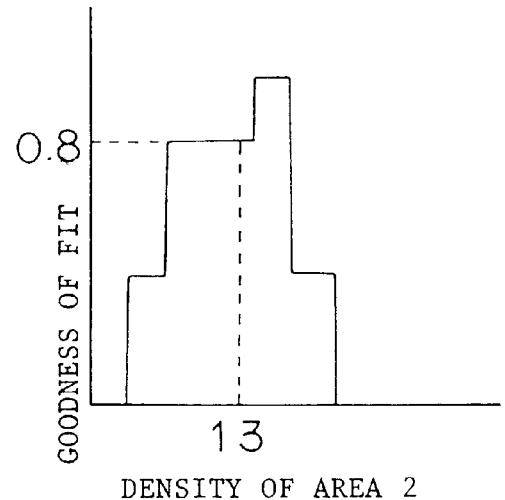
Figure 14:
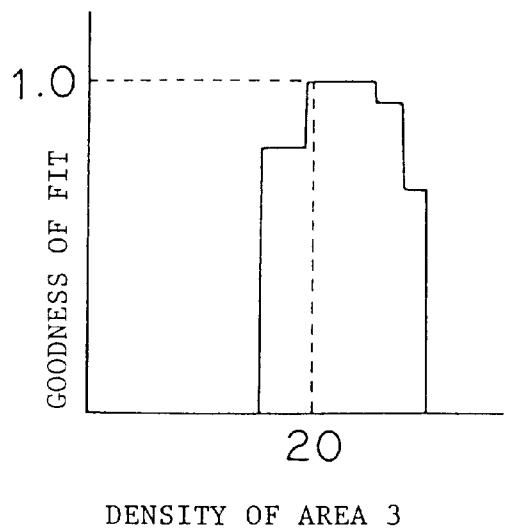
Figure 14:
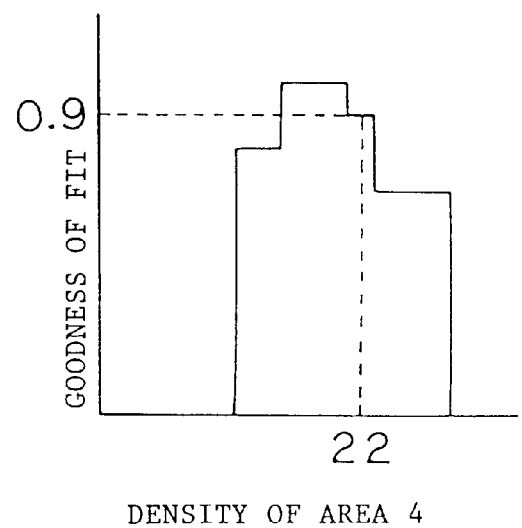

The membership function for each area is stored in dictionary 15 as shown in FIG. 13. Four fuzzy inference blocks 14a, which are connected to dictionaries 15, obtain the goodness of fit of the area density they receive based on a membership function. The output of each fuzzy inference block 14a is transmitted to block 14b, which calculates the goodness of fit. Block 14b obtains the average of the four input values it receives.

For example of this process, let us assume that the membership functions shown in FIGS. 14(A) through (D) are those recorded in dictionaries 15 for the four areas. As shown in FIGS. 11 and 12, the densities of the four areas are 17, 13, 20 and 22. When fuzzy inference blocks 14a find the goodness of fit, that of Area 1 will be 1.0, that of Area 2 will be 0.8, that of Area 3 will be 1.0 and that of Area 4 will be 0.9. The goodness of fit obtained in this way for each area is sent to calculation block 14b, where these four values are averaged to produce a final goodness of fit of 0.925. This value is output to control unit 16.

The membership functions shown in FIG. 13 apply when the angle at which the mark is oriented in the captured image is 0 degrees. Generally, a person who wishes to copy a document will place it parallel to the glass. Since he may rotate the document by one or more turns when he places it on the glass, there are four possible orientations: 0 degrees, 90 degrees, 180 degrees and 270 degrees.

Thus, rotated membership functions must be prepared which correspond to at least these angles of orientation. The image data are then matched with these membership functions and the goodness of fit is obtained. These four orientations are not the only ones possible. We could also create membership functions for images rotated in smaller increments and match the data against these as well. This would enable us to detect a mark accurately even when the document was oriented obliquely on the glass.

The control unit 16 may output the goodness of fit obtained by the matching unit 14 as described above without processing it further, or it may use the goodness of fit to determine whether this document is nonreproducible and output a "halt copying" signal to the copy machine. The final goodness of fit value may be subjected to threshold value processing by either the control unit 16 or the PPC control unit 4. If it is above the threshold value, the item on the glass will be recognized as a nonreproducible document with the specified reference mark, and a "halt copying" signal will be output to the image generator unit 3.

In the embodiment we have been discussing, the matching unit 14 found the number of pixels of a certain color in a given area and extracted the goodness of fit based on this pixel count (i.e., the number of pixels of a certain color was the feature counted). However, with this invention, the matching method is left to the user's discretion. A count of a feature other than number of pixels can be extracted, pattern recognition can be executed by matching the reference mark against a template, or any other method can be used.

In the embodiment we have been discussing, black is the color likely to be used to deface the mark, and only one component (B) of the specified R, G and B components is altered. The invention is not limited to this embodiment. The color likely to be used to deface the mark may be some other color than black, and two or even all three color components may be altered. Detection of a color likely to be used to deface the mark is not limited to one color; two or more colors may be detected. An example is given below.

Figure 15:
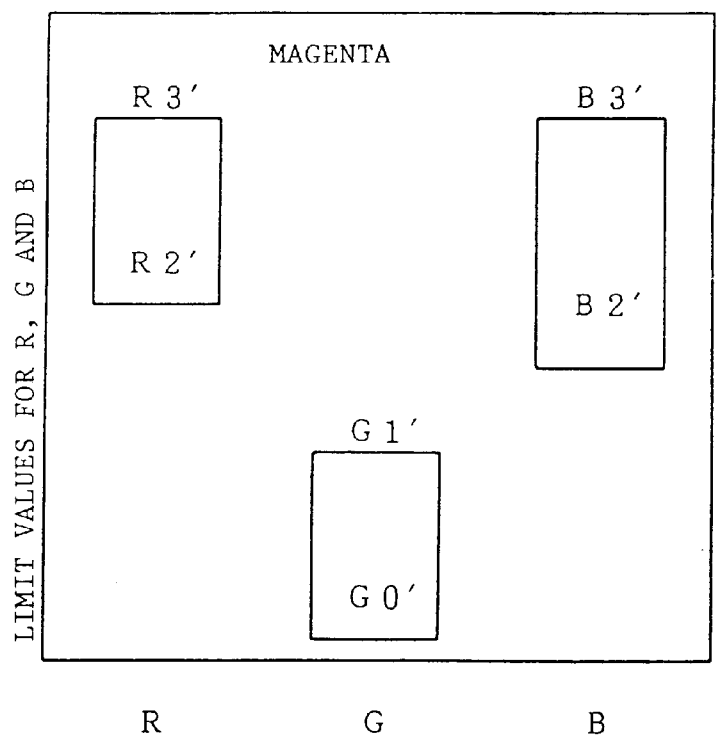
FIG. 15 shows the distribution of R, G and B for magenta, the color of the mark in the second preferred embodiment of this invention.

Let us assume that the characteristic color of the mark is normally magenta. The distribution of the RGB components in magenta is given in FIG. 15. It may be formalized as follows.

$R2' \leq R \leq R3'$ $G0' \leq G \leq G1'$ $B2' \leq B \leq B3'$

Figure 16A:
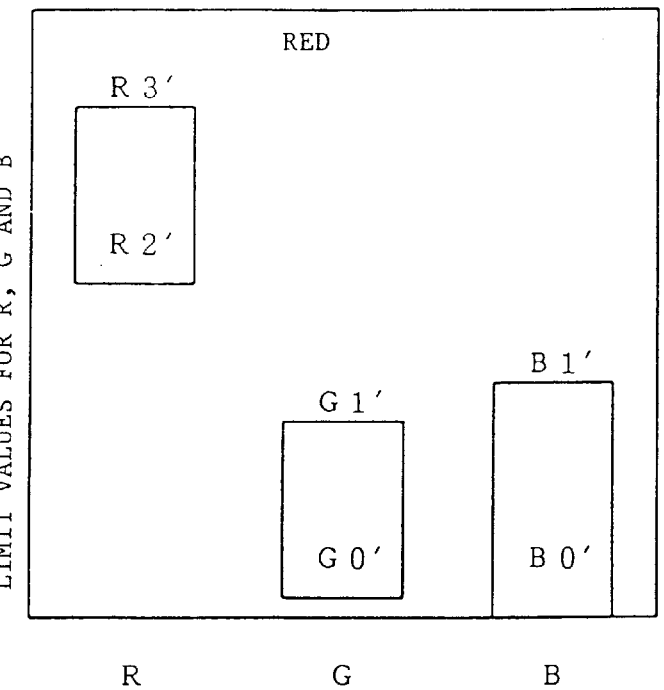
FIGS. 16(A) and 16(B) shows the distribution of R, G and B for red and blue, colors chosen as likely to deface the mark in the second preferred embodiment of this invention.
Figure 16B:
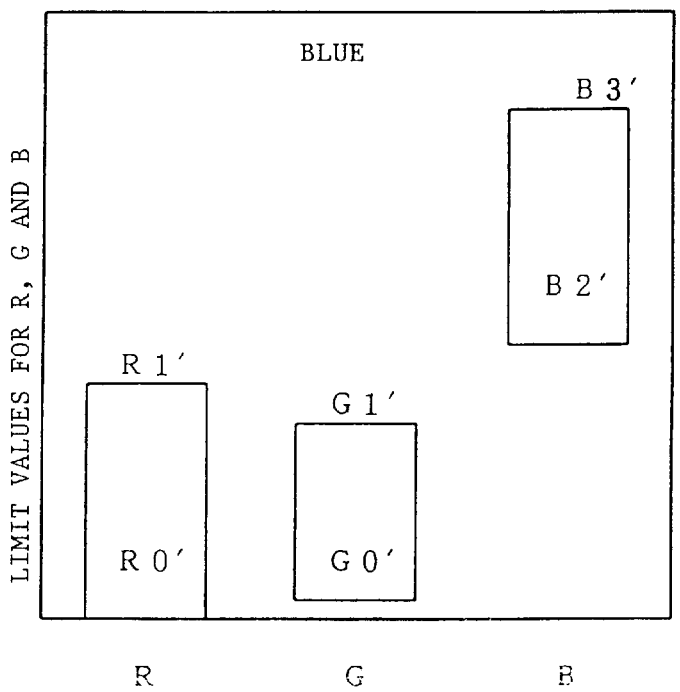

If only one of the color components of magenta is altered, the result may, for example, be red or blue. If, as is shown in FIG. 16(A), the B component of magenta is altered to $B0' \leq B \leq B1'$, red will result. If the R component of magenta is altered to $R0' \leq R \leq R1'$, blue will result.

Figure 17:
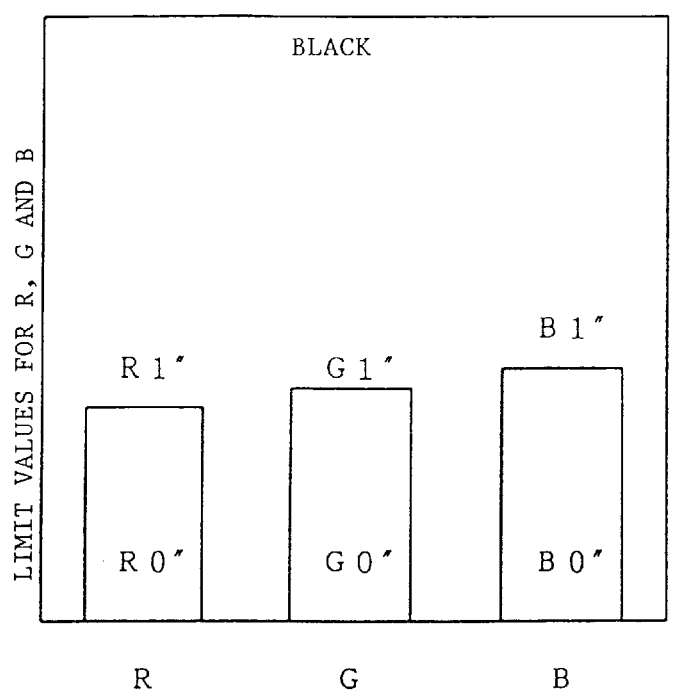
FIG. 17 shows the distribution of R, G and B for black, a color chosen as likely to deface the mark in the second preferred embodiment of this invention.

The RGB components of black, as can be seen in FIG. 17, are as follows.

$R0'' \leq R \leq R1''$ $G0'' \leq G \leq G1''$ $B0'' \leq B \leq B1''$

If we compare this to the composition of magenta, we see that two of the components, R and B, are different.

Figure 18:
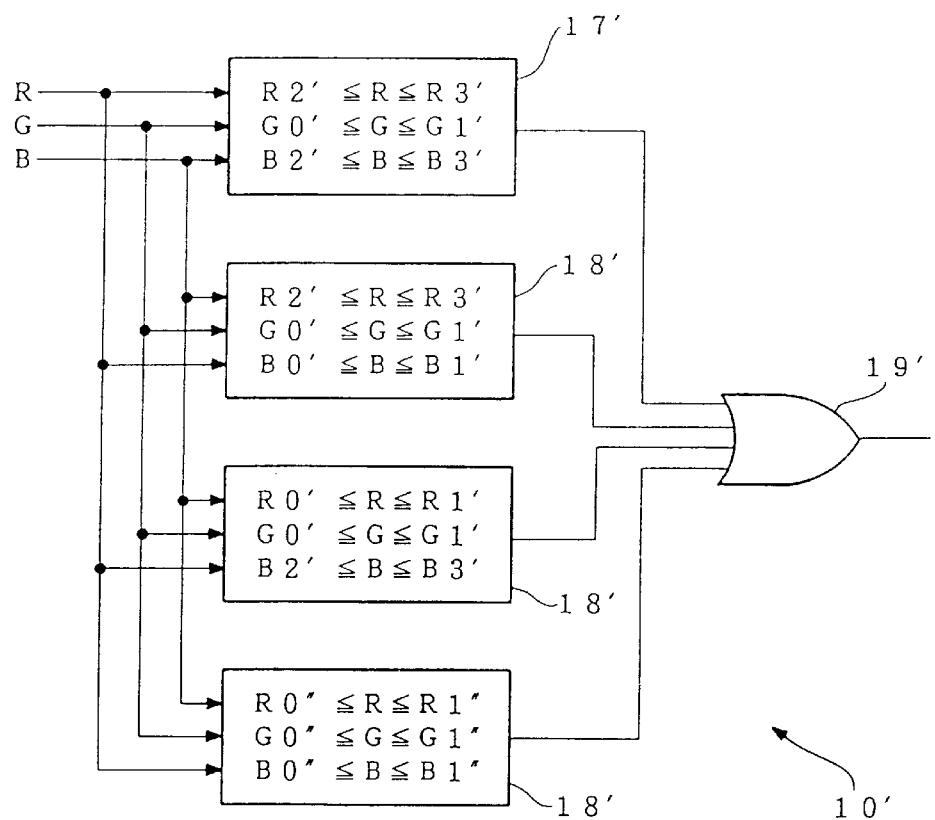
FIG. 18 shows an example of a color extraction unit used in the second preferred embodiment of this invention.

If any of red, blue or black is likely to be used to deface the mark, the color extraction unit 10 pictured in FIG. 2 will be inadequate to detect the defaced mark. In this case it would be advisable to substitute color extraction device 10', shown in FIG. 18.

Extraction block 17' outputs a "1" for every pixel such that all three components, R, G and B, fall within the density ranges given in the figure. Block 17' may be configured like the extraction block pictured in FIG. 3. The upper and lower limit values transmitted to each of the window comparators define the ranges of R, G and B.

Three extraction blocks 18' are arranged in parallel to extract three colors likely to be used to deface the mark. The uppermost block 18' in the drawing outputs a "1" for every pixel in a mark which has been covered over (or defaced) with red. The middle block 18' outputs a "1" for every pixel in a mark which has been covered over (or defaced) with blue. The lowest block 18' outputs a "1" for every pixel in a mark which has been covered over (or defaced) with black.

The outputs of the aforesaid blocks 17' and 18' are input into the four-input OR element 19'.

With this configuration, all pixels constituting a normal magenta mark will be extracted by the block 17' and output as "1". If the mark to be detected has been defaced with red, blue or black, it will be extracted by one of blocks 18' and its constituent pixels will be output as "1". Consequently, the output of the OR element 19', and so also the output of color extraction unit 10', will be "1" for all pixels of a normal mark; and it will also be "1" for all pixels of a mark which has been covered over with one of the three likely colors, provided that the image data meet certain other conditions. Other aspects of the configuration of this extraction unit and the effects of its operation are identical to those of the embodiment described previously.

Although no specific illustrations are provided, it need not be assumed that there are only three colors likely to be used to deface the mark, as was the case in the above embodiment. It would also be permissible to extract two likely colors, or four or more.

In the embodiments we have discussed, the invention was used in a copy machine but the invention is not limited to copy machines. The invention can also be employed in a color scanner, a fax machine, a communication transmission device or various other data transmission devices.

Figure 19:
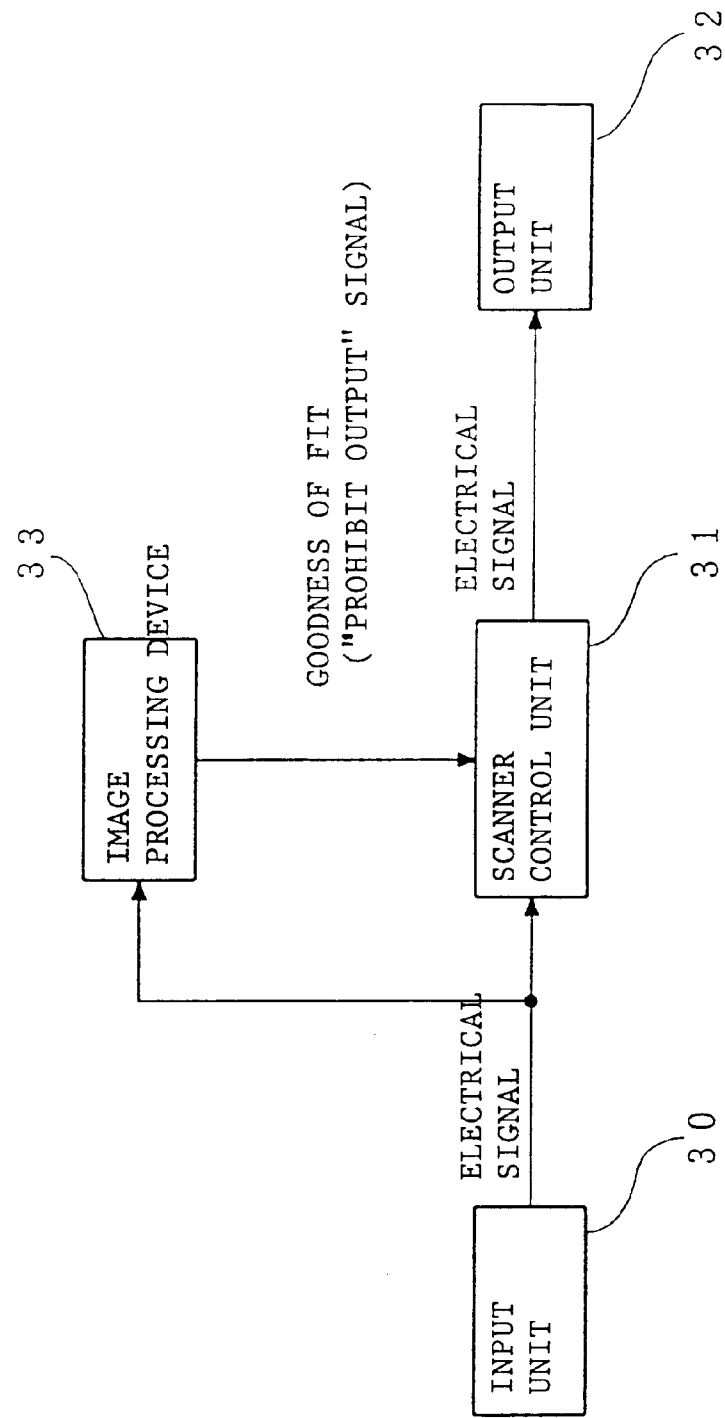
FIG. 19 shows a scanner designed according to this invention.

A configuration of a scanner using the invention is pictured in FIG. 19. Roughly speaking, the scanner may be said to comprise an input unit 30, a scanner control unit 31 and an output unit 32. In the input unit 30, the document is scanned by a beam from a light source. The reflected (or transmitted) beam which results is detected by a photoelectric converter element such as a CCD, a photomultiplier, or a photodiode. It is converted into an electrical signal which is transmitted to the scanner control unit 31. In the unit 31, the electrical signals from the input unit are amplified and subjected to various types of image processing such as correcting the tone and emphasizing the contour. The corrected signals are transmitted to the output unit 32.

In the output unit 32, the data are converted as needed according to signals transmitted from the scanner control unit 31 and output to whatever output device is specified. If the scanner and the printer are two discrete devices (and the scanner simply reads the document), the data must be sent to the printer, and so the image data which are read must be stored temporarily in a storage device (or output device). This requires whatever processing is needed for data write-in.

If the output device is a printer (installed within the scanner), specified processing must be executed to convert the electrical signals to light beams and to convert the signals in order to write the data on a paper medium (a light-sensitive material). Such a configuration can be achieved through the use of currently available devices.

With this invention, the image processing device 33 is installed in the scanner. The signals associated with the image data obtained from the input unit 30 are input into both the scanner control unit 31 and the image processing device 33. The processing device 33 makes use of the various processing units discussed with respect to the above embodiments in order to determine whether the scanned document is impermissible to read.

Image processing device 33 executes specified processing on the image data it receives to obtain the goodness of fit. It transmits this goodness of fit (or a "prohibit output" signal) to scanner control unit 31. In this way, the control unit 31 makes the final determination, based on the goodness of fit, as to whether the document is nonreproducible. If it determines that this is the mark to be detected (i.e., that this is a nonreproducible document), it halts the signal output to output unit 32. If image processing device 33 receives the "prohibit output" signal, output is halted in response to that signal. If image processing device 33 is to output the "prohibit" signal, it may transmit the signal to either the input unit 30 or the output unit 32.

As discussed above, with the image recognition method and device of this invention, a mark which must be detected can be recognized even when its color has been altered, provided that certain conditions are met. Thus, the image data being processed can be recognized as containing the target item to be detected. As a result, even if the mark has been partially or entirely colored over or defaced with a different color, it will still be detected. The copying or reading of the data, and consequently the output of the data, will be prohibited. This enables counterfeiting to be prevented with greater reliability. It is likely that black will be used to color over or deface the mark. In this case, too, the mark will be detected reliably.

When this image processing device is installed in a copy machine or scanner, bank notes, stock certificates and other nonreproducible documents will be reliably prevented from being copied. This can be done by not copying the document, or by making a copy which is different from the original nonreproducible document and outputting the altered copy. The reading or printing of the original document will also be halted.

What is claimed is:

1. An image recognition method for recognizing an object mark in scanned object image data which is on an original nonreproducible document, comprising the steps of:

scanning an image to obtain object image data which includes said object mark;

detecting a presence of a first color in said scanned object image data which is identical to an object color of said object mark on said original nonreproducible document by analyzing three color components, said first color being detected when all of said three color components are respectively identical to a corresponding predetermined color density;

detecting a presence of a second color in said scanned object image data which is a different color from an object color of said object mark on said original nonreproducible document by analyzing three color components, said second color being detected when all of said three color components are respectively within a corresponding predetermined color density range, each predetermined color density range representing a range of predictable color alterations of said object color; and providing an output signal if either said first or second colors are detected in said scanned object image data, wherein said detecting steps are performed in parallel.

2. An image recognition method according to claim 1, wherein said second color which is a different color from said object color is detected when one of said three color components in said scanned object image data is different from a corresponding color component of said object color, and two of said three color components are identical to the corresponding color components.

3. An image recognition method according to claim 1, wherein said second color which is a different color from said object color is detected when two of said three color components in said scanned object image data are different from corresponding color components of said object color, and one of said three color components is identical to the corresponding color component.

4. An image recognition method according to claim 1, wherein said second color in said scanned object image data is black.

5. An image recognition device to recognize an object mark in object image data which is in an original nonreproducible document, comprising:

a first color detection means to detect a presence of a first color in said scanned object image data which is identical to an object color of said object mark on said original nonreproducible document by analyzing three color components, said first color being detected when all of said three color components are respectively identical to a corresponding predetermined color density, said first color detection means having a first detection output; and a second color detection means to detect a presence of a second color in said scanned object image data which is a different color from an object color of said object mark on said original nonreproducible document by analyzing three color components, said second color being detected when all of said three color components are respectively within a corresponding predetermined color density range, each predetermined color density range representing a range of predictable color alterations of said object color, said second color detection means having a second detection output, wherein a logical sum of said first and second detection outputs is used to provide an output signal if either said first or second colors are detected in said scanned object image data.

6. An image recognition device according to claim 5, wherein said second color which is a different color from said object color is detected when one of said three color components in said scanned object image data is different from a corresponding color component of said object color, and two of said three color components are identical to the corresponding color components.

7. An image recognition device according to claim 5, wherein said second color which is a different color from said object color is detected when two of said three color components in said scanned object image data are different from corresponding color components of said object color, and one of said three color components is identical to the corresponding color component.

8. An image recognition device according to claim 5, wherein said second color detection means detects a color of black in said object image data.

9. A copy machine to copy object image data, comprising:
an image recognition device to recognize an object mark in scanned object image data which is in an original nonreproducible document,
a first color detection means to detect a presence of a first color in said scanned object image data which is identical to an object color of said object mark on said original nonreproducible document by analyzing three color components, said first color being detected when all of said three color components are respectively identical to a corresponding predetermined color density, said first color detection means having a first detection output; and
a second color detection means to detect a presence of a second color in said scanned object image data which is a different color from an object color of said object mark on said original nonreproducible document by analyzing three color components, said second color being detected when all of said three color components are respectively within a corresponding predetermined color density range, each predetermined color density range representing a range of predictable color alterations of said object color, said second color detection means having a second detection output,
wherein a logical sum of said first and second detection outputs is used to provide an output signal if either said first or second colors are detected in said scanned object image data.

10. A copy machine according to claim 9, wherein said output signal controls a copy process.

11. A scanner to scan an object image data comprising:
an image recognition device to recognize an object mark in scanned object image data which is in an original nonreproducible document;
a first color detection means to detect a presence of a first color in said scanned object image data which is identical to an object color of said object mark on said original nonreproducible document by analyzing three color components, said first color being detected when all of said three color components are respectively identical to a corresponding predetermined color density, said first color detection means having a first detection output; and
a second color detection means to detect a presence of a second color in said scanned object image data which is a different color from an object color of said object mark on said original nonreproducible document by analyzing three color components, said second color being detected when all of said three color components are respectively within a corresponding predetermined color density range, each predetermined color density range representing a range of predictable color alterations of said object color, said second color detection means having a second detection output,
wherein a logical sum of said first and second detection outputs is used to provide an output signal if either said first or second colors are detected in said scanned object image data.

12. A scanner according to claim 11, wherein said output signal controls reproduction of the object mark.

13. An image recognition method for recognizing an object mark in scanned object image data which is on an original nonreproducible document, comprising the steps of:
scanning an image to obtain object image data which includes said object mark;
detecting a presence of a first reference color in said scanned object image data of said object mark by analyzing three color components, said first reference color being identical to an object color of said object mark and being detected when all of said three components are respectively identical to a corresponding predetermined color density;
detecting a presence of a second reference color in said scanned object image data which is different from said first reference color by analyzing three color components, said second reference color being detected when all of said three components are respectively within a corresponding predetermined color density range, each predetermined color density range representing a range of predictable color alterations of said object color; and
providing an output signal if said first or second reference colors are detected in said scanned object image data, wherein said detecting steps are performed in parallel.

14. An image recognition device to recognize an object mark in scanned object image data which is in an original nonreproducible document, comprising:
a first color detection means for detecting a presence of a first reference color in said scanned object image data of said object mark by analyzing three color components, said first reference color being identical to an object color of said object mark and being detected when all of said three components are respectively identical to a corresponding predetermined color density, said first color detection means having a first detection output; and
a second color detection means for detecting a presence of a second different reference color in said scanned object image data of said object mark by analyzing three color components, said second reference color being detected when all of said three components are respectively within a corresponding predetermined color density range, each predetermined color density range representing a range of predictable color alterations of said object color, said second color detection means having a second detection output,
wherein a logical sum of said first and second detection outputs is used to provide an output signal if either said first or second reference colors are detected in said scanned object image data.

15. A copy machine to copy object image data, comprising:

an image recognition device to recognize an object mark in scanned object image data which is in an original nonreproducible document, a first color detection means for detecting a presence of a first reference color in said scanned object image data of said object mark by analyzing three color components, said first reference color being identical to an object color of said object mark and being detected when all of said three components are respectively identical to a corresponding predetermined color density, said first color detection means having a first detection output, and a second color detection means for detecting a presence of a second different reference color in said scanned object image data of said object mark by analyzing three color components, said second reference color being detected when all of said three components are respectively within a corresponding predetermined color density range, each predetermined color density range representing a range of predictable color alterations of said object color, said second color detection means having a second detection output, wherein a logical sum of said first and second detection outputs is used to provide an output signal if either said first or second reference colors are detected in said scanned object image data.

16. A scanner to scan an object image data comprising:

an image recognition device to recognize an object mark in scanned object image data which is in an original nonreproducible document, a first color detection means for detecting a presence of a first reference color in said scanned object image data of said object mark by analyzing three color components, said first reference color being identical to an object color of said object mark and being detected when all of said three components are respectively identical to a corresponding predetermined color density, said first color detection means having a first detection output, and a second color detection means for detecting a presence of a second different reference color in said scanned object image data of said object mark by analyzing three color components, said second reference color being detected when all of said three components are respectively within a corresponding predetermined color density range, each predetermined color density range representing a range of predictable color alterations of said object color, said second color detection means having a second detection output, wherein a logical sum of said first and second detection outputs is used to provide an output signal if either said first or second reference colors are detected in said scanned object image data.

\* \* \* \* \*